United States Patent
Shih et al.

(10) Patent No.: US 12,417,300 B2
(45) Date of Patent: Sep. 16, 2025

(54) DATA CONTROL METHOD AND DATA CONTROL SYSTEM CAPABLE OF PROVIDING HIGH DATA TRANSMISSION SECURITY

(71) Applicant: BENQ CORPORATION, Taipei (TW)

(72) Inventors: Chia-Nan Shih, Taipei (TW); Chen-Chi Wu, Taipei (TW); Chin-Fu Chiang, Taipei (TW); Chuang-Wei Wu, Taipei (TW); Jung-Kun Tseng, Taipei (TW)

(73) Assignee: BenQ Corporation, Taipei (TW)

( * ) Notice: Subject to any disclaimer, the term of this patent is extended or adjusted under 35 U.S.C. 154(b) by 386 days.

(21) Appl. No.: 17/545,990

(22) Filed: Dec. 8, 2021

(65) Prior Publication Data
US 2022/0179981 A1    Jun. 9, 2022

(30) Foreign Application Priority Data
Dec. 9, 2020 (TW) ................................. 109143430

(51) Int. Cl.
*G06F 21/60* (2013.01)
*G06F 3/14* (2006.01)
*G09G 5/00* (2006.01)

(52) U.S. Cl.
CPC .............. *G06F 21/606* (2013.01); *G06F 3/14* (2013.01); *G09G 5/005* (2013.01); *G09G 2358/00* (2013.01); *G09G 2370/12* (2013.01); *G09G 2370/16* (2013.01); *G09G 2370/22* (2013.01)

(58) Field of Classification Search
CPC ...................... G06F 21/606; G09G 2370/16

USPC ........................................................ 726/26
See application file for complete search history.

(56) References Cited

U.S. PATENT DOCUMENTS

| | | | | |
|---|---|---|---|---|
| 8,938,811 | B2* | 1/2015 | Maeda | G06F 21/604 |
| | | | | 726/30 |
| 11,677,759 | B1* | 6/2023 | Overcash | H04L 12/2801 |
| | | | | 726/26 |
| 2008/0288852 | A1* | 11/2008 | Uehara | H04L 27/2601 |
| | | | | 714/E11.032 |
| 2013/0050084 | A1* | 2/2013 | Soffer | G06F 3/023 |
| | | | | 345/163 |
| 2013/0254431 | A1* | 9/2013 | Kuroiwa | G06F 21/31 |
| | | | | 710/14 |

(Continued)

FOREIGN PATENT DOCUMENTS

| | | |
|---|---|---|
| CN | 109819201 A | 5/2019 |
| TW | 201122838 A1 | 7/2011 |

(Continued)

*Primary Examiner* — William Boddie
*Assistant Examiner* — Bipin Gyawali

(57) ABSTRACT

After a data link between a communication device and a transmitter is established, the transmitter is controlled for determining whether the data link between the transmitter and the communication device is to be disabled when the transmitter is prepared to transmit a first signal to the communication device, or the receiver is prepared to transmit a second signal to the communication device through the transmitter. When the data link is disabled, no signal transmitted from the transmitter is received by the communication device. The first signal and the second signal include feedback control signal information or non-control signal information.

14 Claims, 3 Drawing Sheets

(56) References Cited

U.S. PATENT DOCUMENTS

| | | | |
|---|---|---|---|
| 2014/0204127 A1* | 7/2014 | Tann | H04N 21/440272 |
| | | | 345/660 |
| 2015/0019694 A1* | 1/2015 | Feng | H04L 65/75 |
| | | | 709/219 |
| 2018/0285229 A1* | 10/2018 | Truong | G06F 11/321 |
| 2020/0287735 A1 | 9/2020 | Liao | |
| 2021/0200284 A1* | 7/2021 | Fujimaki | G06F 1/1632 |
| 2021/0280112 A1* | 9/2021 | Phillips | G06Q 30/0257 |
| 2025/0080155 A1* | 3/2025 | Ho | H04W 76/15 |

FOREIGN PATENT DOCUMENTS

| | | |
|---|---|---|
| TW | 201333718 A1 | 8/2013 |
| TW | 201505407 A | 2/2015 |

\* cited by examiner

DATA CONTROL METHOD AND DATA CONTROL SYSTEM CAPABLE OF PROVIDING HIGH DATA TRANSMISSION SECURITY

BACKGROUND OF THE INVENTION

1. Field of the Invention

The present invention illustrates a data control method and a data control system, and more particularly, a data control method and a data control system capable of providing high data transmission security.

2. Description of the Prior Art

With the rapid development of science and technology, various projector systems and conference reporting systems have been adopted in our daily life. The conference report system can be integrated with a projector system for increasing the operational convenience of a presenter when data is presented. Currently, the conference reporting systems use wireless or wired communications for transmitting data to a display device. The data communications methods can be categorized into two modes. In a first mode, a specific software program has to be installed in computers operated by members participating in a conference meeting. The computer can identify several hardware components such as a hard disk, a universal serial bus (USB), and a CD-ROM device. Then, data saved in previously mentioned physical or virtual storage devices can be transmitted to a screen or display device through a wireless network. In a second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, conference reporting systems can use wireless communications technologies for increasing operational efficiency.

Currently, the universal serial bus (USB) port can provide a power supply function (i.e., 5V/0.5 A or 5V/0.9 A). Further, the USB port is a major transmission port for accessing data. However, the management of the USB port is an important issue for data security. Generally, after a USB device is connected to a computer through a hot-plug port, the USB device can generate a control signal to the computer so that the USB device can be identified by the computer. For example, hardware information of the USB device can be displayed on a "device manager" window of the computer. However, since a data link between the USB device and the computer is often attacked by unscrupulous persons or hackers, the security of the control signal (i.e., such as a human interface device (HID) signal) used for identifying the USB device by the computer is questionable. Therefore, to develop a data accessing system with high transmission security is an important issue.

SUMMARY OF THE INVENTION

In an embodiment of the present invention, a data control method is disclosed. The data control method comprises providing a communication device and a transmitter, establishing a data link between the communication device and the transmitter, and controlling the transmitter for determining whether the data link between the transmitter and the communication device is to be disabled when the transmitter is prepared to transmit a first signal to the communication device, or a receiver linked to the transmitter is prepared to transmit a second signal to the communication device through the transmitter. When the data link is disabled, no signal transmitted from the transmitter is to be received by the communication device. The first signal and the second signal comprise feedback control signal information or non-control signal information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
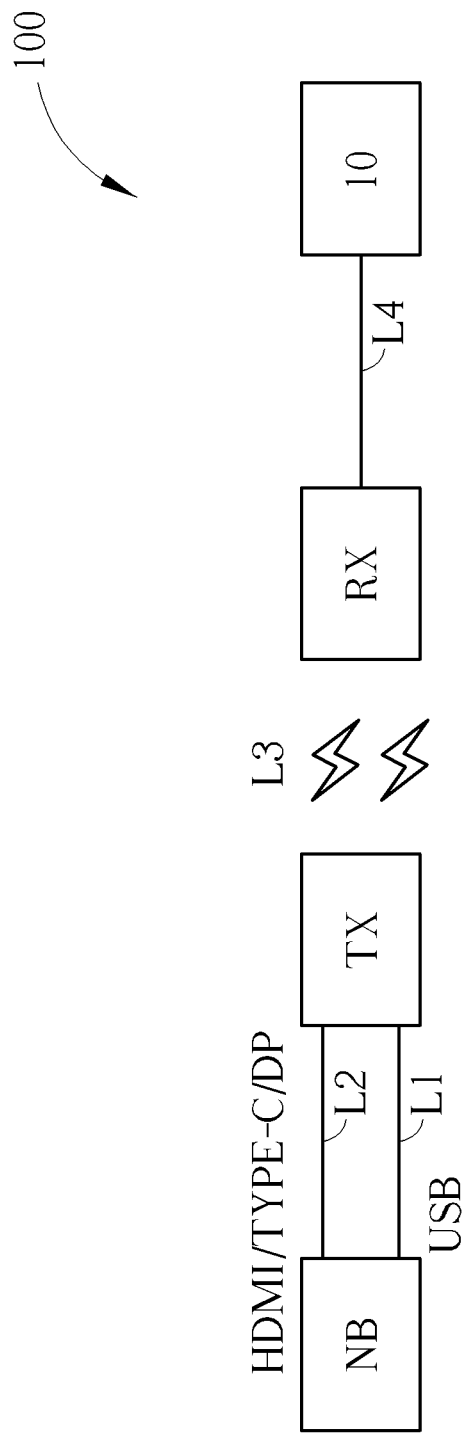
FIG. 1 is a block diagram of a data control system according to an embodiment of the present invention.

FIG. 1 is a block diagram of a data control system 100 according to an embodiment of the present invention. The data control system 100 can be applied to any data transmission network. The block diagram of the data control system 100 is not limited to FIG. 1. The data control system 100 includes a communication device NB, a transmitter TX, a receiver RX, and a display device 10. The communication device NB is used for generating media signals. The communication device NB can be any electronic device capable of generating data, such as a desktop computer, a mobile phone, a media data player, or a notebook. The media signals may include a video data stream and an audio data stream. The transmitter TX is linked with the communication device NB. For example, the transmitter TX can exchange data with the communication device NB through a link L1 and a link L2. The link L1 can be a universal serial bus (USB) link. The USB link can provide a power supply (i.e., such as 5V/0.5 A or 5V/0.9 A) function and a data exchange function. The link L2 can be a High Definition Multimedia Interface (HDMI) port, a type-C universal serial bus (USB type-C) port, or a display port (DP). The link L2 can be used for transmitting media signals, including video data and/or audio data. The receiver RX is linked to the transmitter TX for receiving the media signals through the transmitter TX. The receiver RX has a wireless networking function and can exchange data with the transmitter TX through a wireless link L3. The transmitter TX can transmit the media signals to the receiver RX. The display device 10 is used for displaying the media signals. The display device 10 can establish a wireless link with the receiver RX. For example, the display device 10 can establish a wireless link with the receiver RX by using a Wi-Fi communications protocol.

In the data control system 100, a method for improving data transmission security is to control the communication device NB (i.e., such as a computer) for selectively receiving external "intrusive" signals. In other words, since the transmitter TX is connected to the communication device NB, when the communication device NB cannot receive the signal transmitted from the transmitter TX, the communication device NB cannot identify hardware information of the transmitter TX. Therefore, hardware information of the transmitter TX cannot be extracted from the communication device NB, leading to providing high communication security. In the data control system 100, after the transmitter TX is linked with the communication device NB, if the transmitter TX has a signal (i.e., say, "a first signal") to be transmitted to the communication device NB, or the receiver RX is prepared to transmit a signal (say, "a second signal") to the communication device NB through the transmitter TX, the transmitter TX is controlled for determining whether the link L1 (i.e., for example, USB link) between the transmitter TX and the communication device NB is to be disabled. Further, if the link L1 is disabled, no signal transmitted from the transmitter TX is received by the communication device NB. Further, data formats of the first signal and the second signal to be transmitted to the communication device NB are not limited. For example, the first signal and the second signal can include human interface devices (HID) information, any feedback control signal information or non-control signal information. Details of data communications of the communication device NB, the transmitter TX, the receiver RX, and the display device 10 in the data control system 100 are illustrated later.

Figure 2:
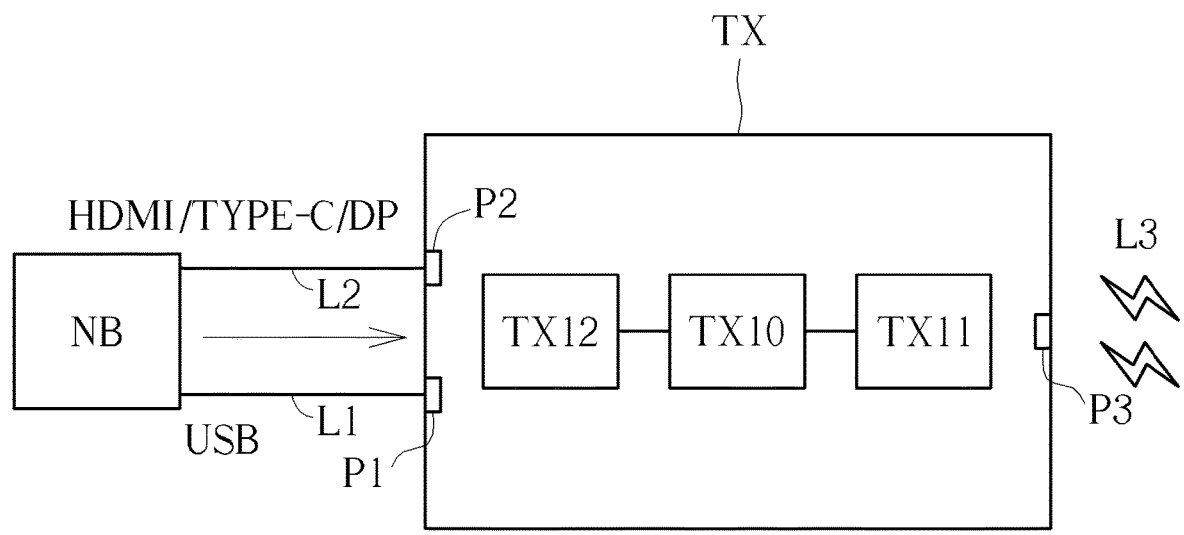
FIG. 2 is a structure illustration of a communication device and a transmitter of the data control system in FIG. 1.

FIG. 2 is a structure illustration of the communication device NB and the transmitter TX of the data control system 100. As previously mentioned, the communication device NB can be any electronic device capable of generating data, such as a desktop computer, a mobile phone, a media data player, or a notebook. The communication device NB can generate media signals. The media signals can be transmitted from the communication device NB to the transmitter TX through the link L2. The communication device NB can also provide power to the transmitter TX. In other words, the power provided from the communication device NB can be used for driving the transmitter TX through the link L1. The transmitter TX includes a processor TX10, a notification unit TX11, and a memory TX12. The processor TX10 can be a chip processor. The notification unit TX11 can include a touch screen and/or physical buttons. The notification unit TX11 and the memory TX12 are coupled to the processor TX10. The transmitter TX also includes a data port P1 to a data port P3. The data port P1 can be a USB port. The data port P2 can be an HDMI/USB TYPE-C/DP port. The data port P3 can be a Wi-Fi port. After the communication device NB is connected to the transmitter TX by using a hot-plug mode, the transmitter TX can acquire (or say, download) hardware driver data from the communication device NB and then report an HID signal to the communication device NB. Then, the communication device NB can identify hardware information of the transmitter TX. However, in order to reduce data leakage risk caused by transmitting the HID signal from the transmitter TX to the communication device NB in an "intrusive" mode, the data control system 100 can selectively block any signals externally transmitted to the communication device NB. Details are illustrated later.

In the data control system 100, the transmitter TX can be controlled by hardware or software for blocking the first signal and the second signal to be transmitted to the communication device NB. As previously mentioned, the transmitter TX includes the notification unit TX11. The notification unit TX11 may include the touch screen and/or physical buttons. The notification unit TX11 is used for displaying information of the second signal transmitted from the receiver RX to the transmitter TX. After browsing the notification unit TX11 by a user, the user can control whether the transmitter TX disables the link L1. For example, when the touch screen and/or physical buttons of the notification unit TX11 are triggered, the transmitter TX can disable at least one data pin of the data port P1 for disabling the link L1. In an embodiment, the transmitter TX can disable the D+/D− pins of the USB port for blocking data accessing between the transmitter TX and the communication device NB. Therefore, the communication device NB only provides power to the transmitter TX. In other words, since the link L1 only has a power transmission function, the communication device NB cannot receive any "external" signal. Therefore, the risk of data leakage can be reduced. Further, the transmitter TX can install an application program. The application program can be used for controlling whether a driving program is to be uploaded from the communication device NB to the transmitter TX. As previously mentioned, the transmitter TX can acquire the driving program from the communication device NB. Then, the communication device NB can identify the hardware information of the transmitter TX accordingly. However, in order to improve information security, when the application program blocks the transmitter TX to download the driving program from the communication device NB, the communication device NB cannot identify the hardware information of the transmitter TX. Since the communication device NB cannot identify the hardware information of the transmitter TX, no data signal can be exchanged between the communication device NB and the transmitter TX through the link L1. In other words, the communication device NB only provides power to the transmitter TX through the link L1. Since no signal can be received by the communication device NB through the link L1, the data security level can be improved. The memory TX12 of the transmitter TX can be used for saving a blocking list of certain signal sources, or saving a blocking list of partial or all commands of the HID signals. Any reasonable utilization of the memory TX12 falls into the scope of the present invention. Further, when the receiver RX transmits the second signal to the transmitter TX, the transmitter TX can directly block the second signal by using the application program (or any software) for avoiding receiving the signal by the communication device NB through the transmitter TX.

Further, in FIG. 2, the data port P2 can be an HDMI/USB TYPE-C/DP port. When the data port P2 is the HDMI port, the link L2 can be regarded as a media channel for transmitting video signals. The link L1 can be regarded as a data channel (i.e., such as a USB channel) for transmitting feedback control signals or any non-control signal. Therefore, in the data control system 100, when the data port P2 is the HDMI port, the data channel of the link L1 can be blocked for avoiding receiving signals by the communication device NB through the link L1. When the data port P2 is a USB TYPE-C or the DP port, the link L1 includes the media channel and the data channel. Therefore, the link L2 can be omitted. Therefore, in the data control system 100, when the data port P2 is the USB TYPE-C or the DP port, the data channel of the link L1 can be disabled. In other words, only media data transmission is available for the link L1. By doing so, no feedback control signal generated from the transmitter TX can be received by the communication device NB. Further, the data port P2 is not limited to the HDMI/USB TYPE-C/DP port. Any technology of blocking external signals transmitted from the transmitter TX to the communication device NB falls into the scope of the present invention.

In the data control system 100, the transmitter TX can be regarded as a virtual display device. Therefore, when the communication device NB transmits the media signals to the transmitter TX through the link L2, high compatibility can be achieved. For example, when the transmitter TX is linked to the communication device NB, the communication device NB can identify the transmitter TX as the virtual display device according to the Extended Display Identification Data (EDID) for transmitting the media signals from the communication device NB to the transmitter TX. In other words, after the communication device NB generates the media signals, the communication device NB can transmit the media signals to the transmitter TX through the data port P2 and the link L2. The transmitter TX transmits the media signals to the receiver RX. The receiver RX transmits the media signals to at least one display device 10.

Figure 3:
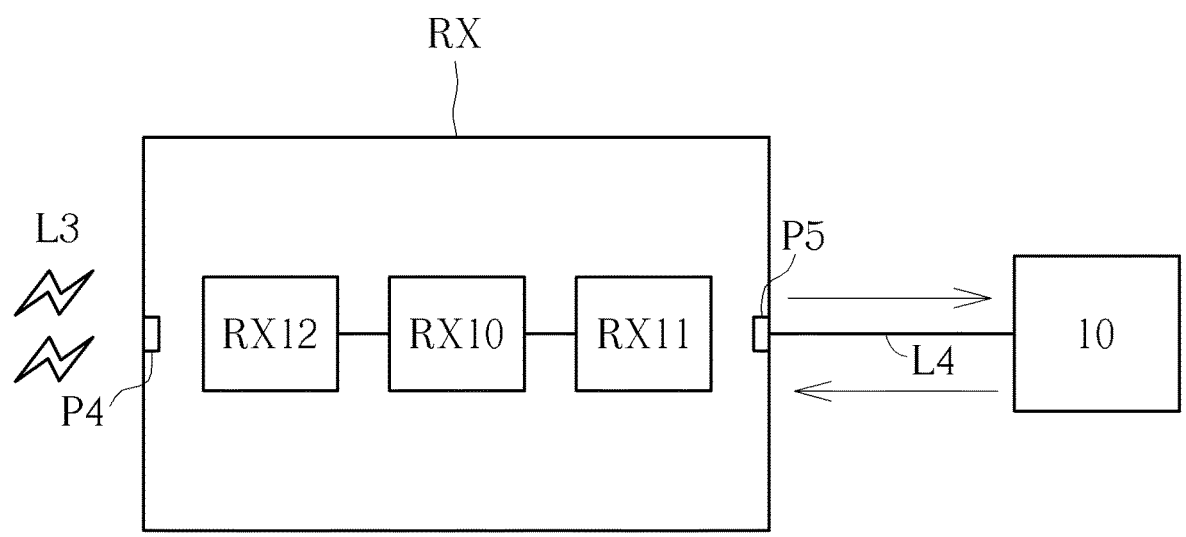
FIG. 3 is a structure illustration of a receiver and a display device of the data control system in FIG. 1.

FIG. 3 is a structure illustration of the receiver RX and the display device 10 of the data control system 100. The receiver RX may include a processor RX10, a display unit RX11 (optional), and a memory RX12. The processor RX10 may be a chip processor. The memory RX12 can be used for saving data, such as a general universal device list. The display unit RX11 can display an operation interface, a notification interface and/or a status interface. The processor RX10 is coupled to the display unit RX11 and the memory RX12. As previously mentioned, the receiver RX can use the link L3 (i.e., the wireless link) for exchanging data with the transmitter TX. The receiver RX may also include a data port P4 and a data port P5. The data port P4 can be a Wi-Fi port. The data port P5 can be a wired or wireless data port for establishing a link with the display device 10. In FIG. 2, after the transmitter TX is linked to the communication device NB, the transmitter TX can generate a human interface device (HID) command signal for performing a registration process to the communication device NB. A transmission path can be illustrated as: the transmitter TX→the communication device NB. In FIG. 3, after the receiver RX establishes a link with the display device 10, when the receiver RX and the display device 10 exchange data, the HID command signal can also be generated. A transmission path can be illustrated as: the display device 10→the receiver RX→the transmitter TX→the communication device NB. Further, the "display device 10" shown in FIG. 3 is only a device of this embodiment. In other words, any HID-based device supported to link with the receiver RX can also be applied to the data control system 100. Further, a control signal transmitted by using the transmission path: "the receiver RX→the transmitter TX→the communication device NB" can carry conference link data or identification data. Moreover, the memory RX12 in the receiver RX can be used for saving the universal device list. When a hardware component linked to the receiver RX is listed in the universal device list, the receiver RX can generate a request signal to the transmitter TX for enabling the link L1. After the link L1 is enabled, a driving program of the hardware component can be loaded to the hardware component. Thus, the hardware component can be identified. When the hardware component linked to the receiver RX is absent in the universal device list, the receiver RX can generate a control signal to the transmitter TX for disabling the link L1 so that the hardware component is unidentified.

As shown in FIG. 1 to FIG. 3, communications of the "intrusive" signal received by the communication device NB include two transmission modes: (a) the transmitter TX→the communication device NB, (b) the receiver RX→the transmitter TX→the communication device NB. In order to avoid receiving external signals by the communication device NB, the data control system 100 can control whether the link L1 is to be disabled for inhibiting a data exchange function. After the data exchange function of the link L1 is disabled, the communication device NB cannot receive any signal. By doing so, the link L1 is only used for a function of power transformation. Further, an initial condition of the link between the receiver RX and the hardware component is a disabling state. An initial condition of the link L1 can also be the disabling state. By doing so, since a "common" path L1 of (a) and (b) modes can be disabled, the communication device NB cannot receive any signal.

Figure 4:
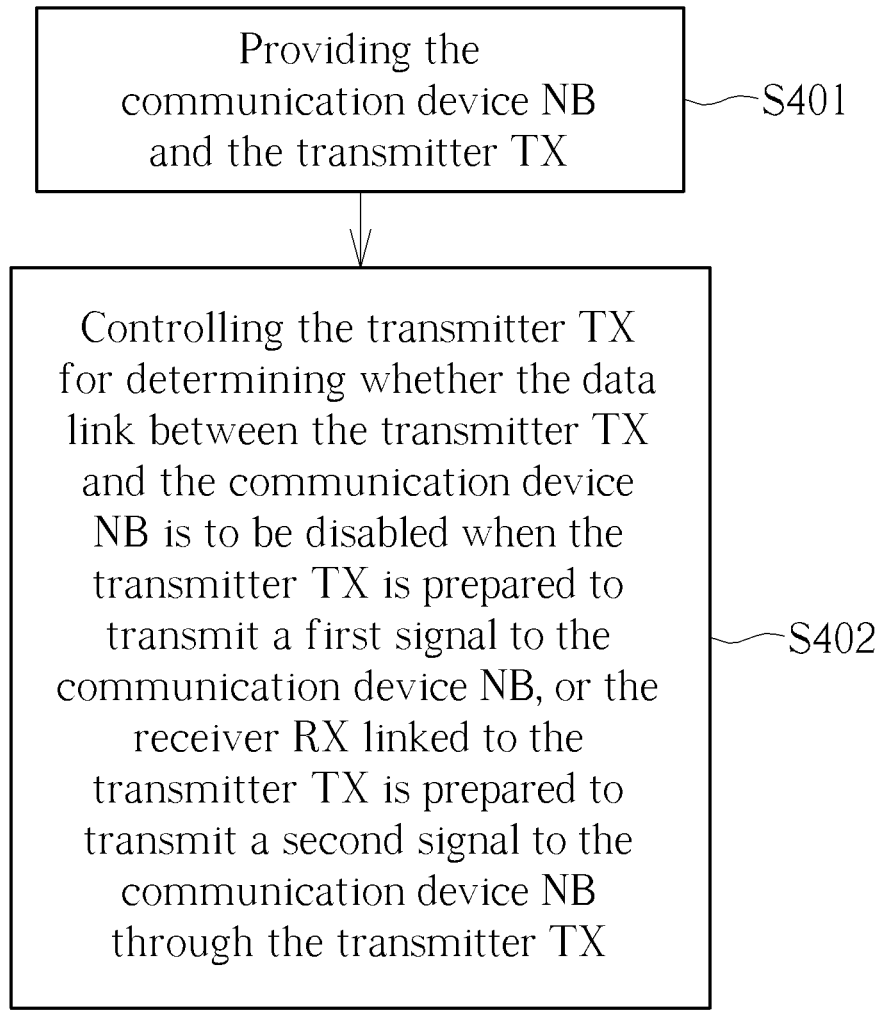
FIG. 4 is a flow chart of performing a data control method by the data control system in FIG. 1.

FIG. 4 is a flow chart of performing the data control method by the data control system 100. The data control method includes step S401 to step S402. Any technology modification falls into the scope of the present invention. Step S401 to step S402 are illustrated below.

step S401: providing the communication device NB and the transmitter TX;

step S402: controlling the transmitter TX for determining whether the data link between the transmitter TX and the communication device NB is to be disabled when the transmitter TX is prepared to transmit a first signal to the communication device NB, or the receiver RX linked to the transmitter TX is prepared to transmit a second signal to the communication device NB through the transmitter TX.

Details of step S401 to step S402 are previously illustrated. Therefore, they are omitted here. Briefly, in the data control system 100, in order to reduce a risk of data leakage of the communication device NB (i.e., such as a computer), the transmitter TX linked to the communication device NB only supports a one-way data transmission mode. In other words, media data can only be transmitted from the communication device NB to the transmitter TX through the link L2 (i.e., HDMI/USB TYPE-C/DP). The link L1 is only used for supplying power to the transmitter TX from the communication device NB. Therefore, since the communication device NB cannot receive any "external" signals, the communication device NB is hard to be attacked by hackers, thereby providing high information security.

To sum up, the present invention discloses a data control system. The data control system can control the link between the communication device and the transmitter by using a software program or an interface. When the data control system allows bi-directional data transmission between the communication device and the transmitter, the transmitter can transmit data signals to the communication device (i.e., such as control signals or non-control signals). The communication device can transmit media signals to the transmitter. When the data control system restricts the link between the communication device and the transmitter under a one-way transmission mode (unidirectional data transmission mode), any signal prepared to be transmitted from the transmitter to the communication device can be blocked. Therefore, no signal can be received by the communication device. The communication device can only transmit media signals to the transmitter. Since the communication device cannot receive any signal transmitted from other hardware device. Hardware information of the hardware device can be masked. For example, no hardware information of the hardware device is displayed on the device manager window of the computer. Therefore, the communication device is hard to be attacked for extracting the hardware information of the hardware device by hackers, thereby providing high information security.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data control method comprising:
   providing a communication device and a transmitter;
   connecting the communication device with the transmitter under a hot-plug mode;
   establishing a data link between the communication device and the transmitter after the communication device and the transmitter are connected;
   controlling an application program of the transmitter to prevent the transmitter from acquiring hardware driver data from the communication device that is necessary for a human interface device (HID) identification after the communication device and the transmitter are connected, wherein the transmitter is unidentified by the communication device after the hardware driver data is blocked by the application program of the transmitter;
   controlling the transmitter for disabling the data link when the transmitter is prepared to transmit HID information to the communication device; and
   controlling the transmitter for blocking a second signal prepared to be transmitted from a receiver to the transmitter by the application program, even when the data link between the communication device and the transmitter is not yet disabled;
   wherein the receiver is linked to the transmitter, the second signal is an internal system signal transmitted from the receiver, when the data link is disabled, no signal transmitted from the transmitter is to be received by the communication device, the second signal comprises feedback control signal information or non-control signal information, the transmitter disables at least one data pin of the data link for disabling the data link by a touch screen or a physical button.

2. The method of claim 1, wherein the transmitter comprises a notification unit, the notification unit is configured to display information of the second signal being transmitted from the receiver to the transmitter.

3. The method of claim 1, wherein the application program is installed in the transmitter, the application program is configured to control whether the hardware driver data is uploaded from the communication device to the transmitter.

4. The method of claim 1, further comprising:
   generating a media signal by the communication device;
   transmitting the media signal from the communication device to the transmitter through a data port;
   transmitting the media signal from the transmitter to the receiver; and
   transmitting the media signal from the receiver to at least one display device.

5. The method of claim 1, wherein after the data link between the communication device and a transmitter is blocked, the communication device only provides power to the transmitter.

6. The method of claim 1, wherein the receiver has a universal device list, when a hardware component linked to the receiver is listed in the universal device list, the receiver generates a request signal to the transmitter for enabling the data link to load a driving program of the hardware component for identifying the hardware component, and when a hardware component linked to the receiver is absent in the universal device list, the receiver generates a control signal to the transmitter for disabling the data link so that the hardware component is unidentified.

7. The method of claim 6, wherein an initial condition of the data link between the receiver and the hardware component is a disabling state.

8. A data control system comprising:
   a communication device configured to generate a media signal;
   a transmitter linked to the communication device;
   a receiver linked to the transmitter and configured to receive the media signal through the transmitter; and
   a display device configured to display the media signal;
   wherein after the communication device is connected with the transmitter under a hot-plug mode, a data link between the communication device and the transmitter is established, an application program of the transmitter is controlled to prevent the transmitter from acquiring hardware driver data from the communication device that is necessary for a human interface device (HID) identification after the communication device and the transmitter are connected, the transmitter is unidentified by the communication device after the hardware driver data is blocked by the application program of the transmitter, the transmitter is controlled for disabling the data link when the transmitter is prepared to transmit HID information to the communication device, the transmitter is controlled for blocking a second signal prepared to be transmitted from the receiver to the transmitter by the application program, even when the data link between the communication device and the transmitter is not yet disabled, the receiver is linked to the transmitter, the second signal is an internal system signal transmitted from the receiver, when the data link is disabled, no signal transmitted from the transmitter is received by the communication device, the second signal comprises feedback control signal information or non-control signal information, the transmitter disables at least one data pin of the data link for disabling the data link by a touch screen or a physical button.

9. The system of claim 8, wherein the transmitter comprises a notification unit, the notification unit is configured to display information of the second signal transmitted from the receiver to the transmitter.

10. The system of claim 8, wherein the application program is installed in the transmitter, the application program is configured to control whether the hardware driver data is uploaded from the communication device to the transmitter.

11. The system of claim 8, wherein after the communication device generates the media signal, the communication device transmits the media signal to the transmitter through a data port, the transmitter transmits the media signal to the receiver, and the receiver transmits the media signal to at least one display device.

12. The system of claim 8, wherein after the data link between the communication device and a transmitter is blocked, the communication device only provides power to the transmitter.

13. The system of claim 8, wherein the receiver has a universal device list, when a hardware component linked to the receiver is listed in the universal device list, the receiver generates a request signal to the transmitter for enabling the data link to load a driving program of the hardware component for identifying the hardware component, and when a hardware component linked to the receiver is absent in the universal device list, the receiver generates a control signal to the transmitter for disabling the data link so that the hardware component is unidentified.

14. The system of claim 13, wherein an initial condition of the data link between the receiver and the hardware component is a disabling state.

\* \* \* \* \*